Aug. 21, 1923.  
J. H. C. DE BREY  
PROCESS FOR TREATING HYDROCARBONS  
Filed June 1, 1918  
1,465,599
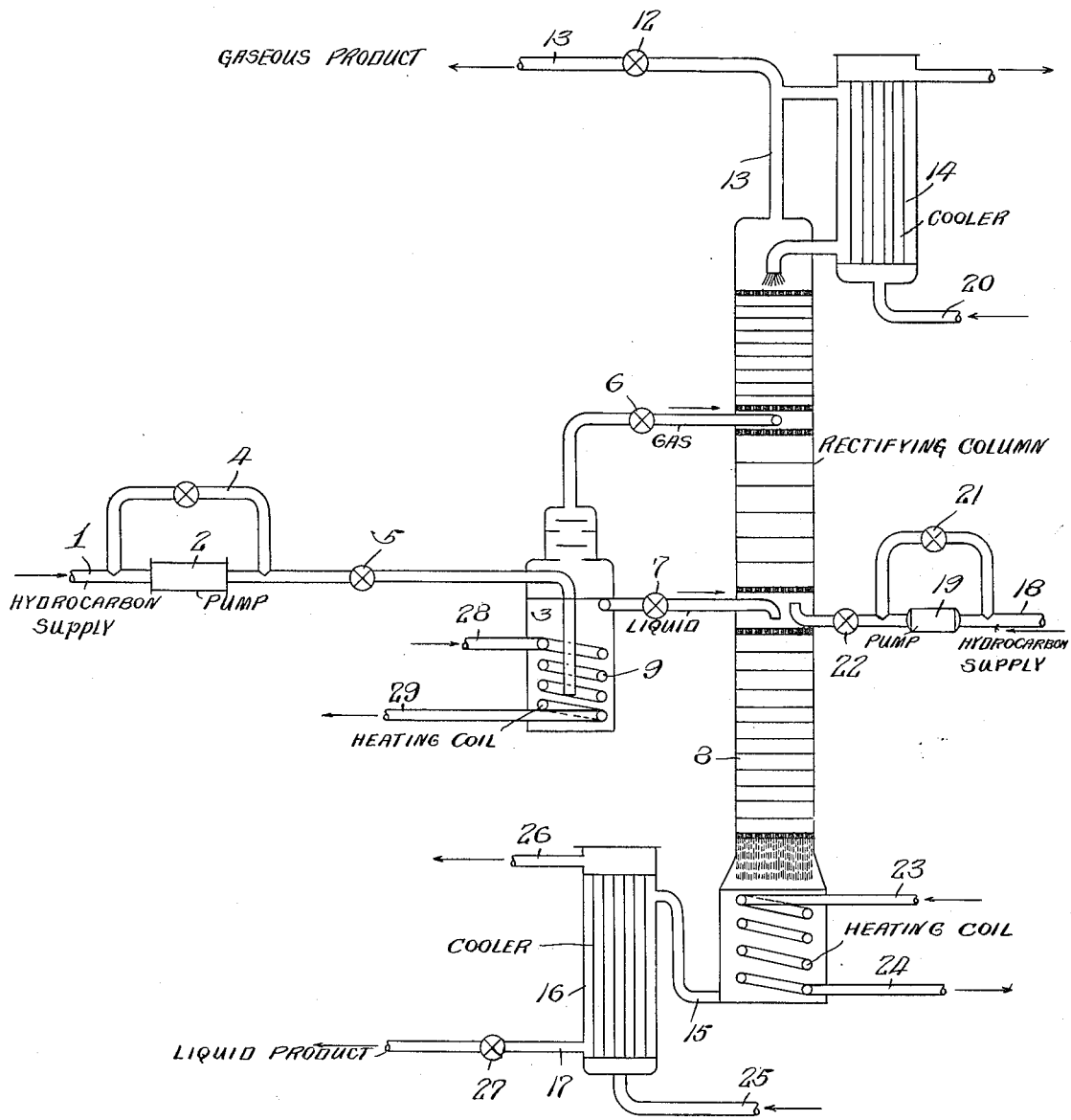

Patented Aug. 21, 1923.

1,465,599

UNITED STATES PATENT OFFICE.

JAN HEINRICH CHRISTOPH DE BREY, OF THE HAGUE, NETHERLANDS.

PROCESS FOR TREATING HYDROCARBONS.

Application filed June 1, 1918. Serial No. 237,802.

*To all whom it may concern:*

Be it known that I, JAN HEINRICH CHRISTOPH DE BREY, subject of the Queen of the Netherlands, residing at The Hague, Kingdom of the Netherlands, have invented certain new and useful Improvements in Processes for Treating Hydrocarbons, of which the following is a specification.

The object of my invention is the perfection of a process whereby mixtures of hydrocarbons which volatilize at different temperatures and containing highly volatile fractions either in a purely vaporous form or both in a liquid and vaporous form or even gases may be decomposed into two components, a liquid and a gaseous one, the liquid component being obtained practically free from those volatile fractions, whose recovery in a liquid state is not intended, and the gaseous component practically free from those fractions of minor volatility which for the purposes of the present invention should be recovered in liquefied form.

In my specification I will designate hereafter those fractions of minor volatility, which according to my present invention should be recovered in liquid state, as valuable fractions; and those very volatile components, which in the original mixture of hydrocarbons were present either in vaporous or in liquid form and further the gases which were in solution in the said mixture and the recovery of which in liquefied form is of no value for the purposes of my invention, as worthless fractions. For example in the extraction of gasoline from casing-head gas the valuable fractions will consist of liquids of the gasoline type, while the worthless fractions will be the more difficultly condensible components.

Examples of mixtures of hydrocarbons which can be treated by the process of my present invention and which contain the said valuable and worthless fractions intermixed with each other, are "lean" gases, casing-head gases containing gasoline, and still-gases developed during and by the distillation of crude petroleum or similar bodies, as, for example, bituminous shale and the like.

The term "still-gases" is to be understood as including those fractions of great volatility, and gases such as are present in the crude petroleum, which volatilize during the distillation, remaining in gaseous form during and after the subsequent condensation and which, enriched with valuable fractions, escape in gaseous form owing to the fact that by application of processes used hitherto, these gases cannot be recovered in liquid form. The said processes used hitherto are condensation, treatment of the gaseous substances containing the said valuable components in the scrubber and the like.

Other mixtures of hydrocarbons which may be treated according to my present invention with a view to the recovery of the valuable fractions from the worthless are tar obtained in the manufacture of illuminating gas and the manufacture of coke and products obtained from oil-cracking processes.

The separation from casing-head, "lean" or still-gases of hydrocarbons, the recovery of which in liquid state was intended for instance, gasoline, was affected hitherto by compression or absorption or by a suitable combination of these processes with each other.

The object of the present invention is methodically to create those technical conditions under which the two components can be separated to such an extent as to produce a gaseous component practically free from all valuable fractions, and the valuable component practically free from all detrimental worthless fractions.

In such mixtures of hydrocarbons as are separated by the methods hitherto known, from casing-head, "lean" or still-gases the said valuable and worthless fractions are mixed with each other in a state such that they are not a marketable product.

In order to remove this inconvenience and to transform these mixtures into a marketable product, two methods have hitherto been followed.

The one is an evaporation process, known as the weathering process, whilst the other, which is called "blending process" consists in mixing the liquid hydrocarbons with heavier hydrocarbons.

The evaporation or weathering process consists in causing the very volatile fractions to evaporate. It has, however, the disadvantage that a considerable percentage of the valuable fractions escapes simultaneously and are thus lost.

In this weathering process, on the average to 30% of the mass treated is evaporized. The fact that a considerable part of these fractions are gasoline fractions, proves that the process must be considered very disadvantageous from the point of view of economy.

Hitherto means were not known by which the escape of the said valuable gasoline fractions into the atmosphere might be prevented.

Since the said gasoline fractions could not be separated from the worthless fractions, there was for them no other industrial application than use for heating or like purposes.

Although the blending process is not responsible for such heavy losses of valuable constituents as the weathering process, nevertheless the loss of valuable components by this process is considerable enough, and more especially in those cases where the lighter hydrocarbons have to be driven off from the mixture.

The application of so-called absorbers, which have been used either in combination with either of the two methods described (weathering or blending process) or independently of them, reduces the loss of the said valuable fractions, but does not entirely avoid them, and this for the following reason: Although by absorption valuable fractions contained in said mixtures of hydrocarbons can be bound or fixed, when the absorbent is distilled to regenerate it, a considerable loss is again suffered, for the absorbent takes up not only the worthless fractions but also a considerable part of the valuable fractions. The worthless volatile fractions which leave the condenser as vapour, carry a considerable part of valuable fractions with them.

According to the present invention all these disadvantages and the loss of valuable fractions are nearly entirely avoided. This result is attained by subjecting the said mixtures of hydrocarbons to a rectification process whereby the separation into valuable and worthless components occurs. It may here be mentioned that by the term "rectification" thruout this specification and claims "splitting up by means of a rectification column" is meant.

Mixtures of hydrocarbons containing very volatile fractions cannot, as is generally known, under normal conditions be separated into two components by rectification, for the reason that of the two components to be separated, the one of the smaller specific gravity, having the higher Baumé gravity, does not condense at normal pressure and therefore cannot under these conditions be liquefied.

Now a further novelty of my invention consists in subjecting the said mixtures of hydrocarbons containing fractions of high volatility to such treatment as to transform them in spite of their volatility, not only into gaseous form, but also into the liquid state.

This technical result is, according to my invention attained by effecting the process of rectification at high pressure.

A feature of my invention consists in employing a pressure sufficiently high to produce a condensation of the worthless fractions at that phase of the process of rectification, at which the last traces of the valuable fractions must be washed out from the gaseous component by the condensed worthless fractions or by the condensed parts of them, this having been effected by the use of cooling water alone or such cooling means as are commonly used in connection with the rectification process.

From the foregoing it results that my process should be carried out within two certain limits of temperature; the minimum temperature can be somewhat higher than the temperature of the cooling agent, as for example, cooling water, while the maximum temperature at which the rectification process according to my invention is carried out, is determined by that degree of heat, at which at a given pressure the worthless fractions are either completely or to such an extent as necessary, expelled from the liquid component.

From the above it further appears that between the temperature and the pressure employed, there exists a certain relation which can be determined namely: that the degree of temperature to be used depends upon the pressure employed; the limits of the temperature forming a mathematical function of the pressure.

The pressure used depends upon the physical property of the mixture of hydrocarbons to be treated, and may be raised to 20 atmospheres and beyond same, while the two limits of temperatures employed, although depending on the one hand upon the physical properties of the said mixture of hydrocarbons, also depend upon the temperature of the cooling medium employed.

The pressure required for carrying my process into practice can be produced by any convenient means; a pressure of 20 or more atmospheres produced by a compressor, will in many cases be the most suitable.

A further characteristic feature of my invention consists of the following:

While submitting the mixture of hydrocarbons to be treated, to the rectification process at high pressure, the separation of the valuable and worthless components from each other can be facilitated, accelerated and materially improved, by submitting the said mixture of hydrocarbons to a preliminary treatment. The purpose of such preliminary treatment is to bring the gaseous and liquid components of the mixture of hydrocarbons into a state of preliminary separation, whereby the most favorable conditions for the subsequent rectification process under high pressure is secured.

This preliminary treatment consists of heating under high pressure the mixture of hydrocarbons, which according to my invention is to be subjected to the subsequent rectification process at high pressure to a temperature such as will make the aforesaid relationship between the divided gaseous and liquid components most favorable for the rectification process.

In this preliminary treatment the pressure employed must be at least equal to that used in the subsequent rectification process, or may even be higher, while the temperatures used, depending upon the physical properties and chemical constitution of the mixture of liquid hydrocarbons must be kept lower than the maximum temperature used during the rectification.

I wish to point out that I can also carry out my process in such a way, as to employ the mixture of hydrocarbons, while subjecting same to the rectification process at high pressure and at the temperatures mentioned, not only in liquid form, but also partly in liquid and partly in gaseous state.

The following is an example for carrying my invention into practice:

The mixtures of very volatile hydrocarbons to be treated according to my process, are placed in suitable vessels, where they are subjected to the rectification under high pressure, for example, 20 atmospheres or more. The two limits of temperature are selected in such a way as to cause with the aid of the pressure present in the vessel, on the one hand the elimination of the worthless fractions from the liquid component, and on the other hand the removal or washing out of the last traces of valuable fractions from the gaseous component, this being effected by means of the condensed worthless fractions or of a suitable part of same.

The degrees of temperature used in connection herewith, and which, as already pointed out, depend upon the physical properties of the hydrocarbons to be treated, range between two limits, for example, for casing head gasoline under a pressure of about 20 atmospheres, between a maximum temperature of about 150° C. and a minimum temperature of about 40° C.

The worthless component after having undergone the above treatment is freed of all valuable fractions and may now either be allowed to escape or be used for any required technical purpose, while the liquid component is retained as a marketable product containing the highest possible amount of valuable fractions, thereby approaching the theoretical maximum.

As already mentioned, the process of rectification can be improved and rendered more effective by subjecting the mixture of hydrocarbons, prior to submitting the same to rectification, to a preliminary treatment for the purpose above indicated, in order to separate and transform the liquid and gaseous components into a certain relationship, by which the rectification process is rendered most advantageous. For this purpose, according to the said preliminary treatment, the mixture of hydrocarbons is submitted in suitable vessels to a pressure which is at least as high as the pressure employed during the rectification, and which can even surpass this pressure, while the temperatures simultaneously used, must be, as already indicated, lower than the highest temperature used during the rectification process.

In the example given above, the pressure to be used may be 20 atm. or more, whilst the temperature employed may be raised to about 125° C.

From the vessel in which the said preliminary treatment has been effected, the two separated components are now conducted to the vessels employed for effecting the rectification. Both the rectification process and the preliminary treatment may be carried out either continuously or periodically.

The accompanying drawing shows a sectional view of one form of apparatus suitable for carrying out the invention:

In the arrangement shown the casing-head gasoline is supplied by tube 1 to the pump 2 and is forced into the reservoir 3 wherein a pressure of 20 atmospheres is maintained.

The supply of casing-head gasoline is regulated by a by-pass regulating valve 4 connected with the pump 2, and the internal pressure in the reservoir 3 is regulated and adjusted by means of three regulating valves 5, 6 and 7.

The casing-head gasoline in the reservoir 3 is heated to about 125° C., by means of a heating coil 9 having a steam inlet 28 and an outlet 29, in the preliminary treatment hereinbefore mentioned.

As a result of this preheating, one part of the casing-head gasoline will be volatilized whilst another part of same remains liquid.

Both the liquid part and the volatilized compounds are conducted into a high pressure rectifying column 8; the gaseous fractions are introduced into the upper part, and the liquid components into the lower part of the column, according to the worthless fractions contained in the said two parts.

In the high pressure rectifying column 8 there exists an internal pressure of 19 atmospheres and the vapours rising in this column meet with a stream of condensed light fractions, running back from a cooler 14 having a water inlet 20 into the rectifying column 8.

At the bottom 10 of the rectifying column 8 the heaviest components are collected in liquid state, and under the action of a heating coil 11 having a steam inlet 23 and outlet 24 are therein heated to about 150° C. for the purpose of expelling the last traces of the worthless fractions.

After the state of equilibrium has been attained and after all the regulating valves have been brought into working position, the apparatus will work continuously.

From the top of the column 8 a stream of gases escapes through tube 13 and regulating valve 12, consisting exclusively of worthless fractions, the last traces of valuable fractions having been washed out by the condensate coming from the cooler 14; and from the bottom of the column 8 a stream of liquid gasoline is conducted away at 15, through cooler 16 and tube 17, consisting exclusively of valuable fractions, entirely or nearly entirely freed from gas and light fractions, which liquid forms an immediately marketable product, free from all the detrimental properties of the "raw casing-head gasoline," as for example high vapour-pressure and the like. The cooler 16 has water inlets and outlets 25, 26 respectively and tube 17 has a valve 27.

The above description refers to the treatment of mixtures of hydrocarbons in the liquid state.

The said mixtures occur however also in gaseous condition as for instance in refineries, where still gases are obtained as a secondary constituent.

In such cases the mixture is not introduced into the system (8, 3) through tube 1, but through the tube 18, and by the aid of a compressor 19 it is forced into the column 8 under a pressure of 20 atmospheres. A by-pass valve 21 is arranged for the compressor and a regulating valve 22 is provided between the compressor 19 and column 8. If at the said compression of 20 atmospheres the said gases are liquefied, the liquid obtained may be carried to the reservoir 3 and then submitted to the further preliminary treatment as above described.

The introduction of the hydrocarbon mixtures through tubes 1 and 18 may take place simultaneously or in other words, if found suitable in the industrial application both liquid and gaseous mixtures may be subjected simultaneously to the aforesaid treatment.

I claim:

1. The process of treating mixtures of hydrocarbons containing a valuable liquid and a worthless gaseous component which comprises rectifying the mixture at a pressure not less than twenty atmospheres and correlating the pressure and the temperature range of rectification in such manner that the maximum temperature is sufficient to expel all the worthless component from the valuable component while the minimum temperature is sufficient to condense a portion of the worthless component whereby the last fractions of valuable component are washed out of the gaseous worthless component by the liquefied worthless portion thus condensed.

2. In the process of rectifying hydrocarbons containing a valuable liquid and a worthless gaseous component at pressures not less than 20 atmo., washing out the last traces of valuable component from the gaseous worthless component by liquid worthless component which is returned to the sphere of rectification.

3. A process as claimed in claim 1 in which casing head gasoline is treated.

4. A process as claimed in claim 2 in which casing head gasoline is treated.

5. Process for treating mixtures of hydrocarbons of different volatility, consisting in the separation of said mixture into two components, a valuable liquid one, practically free of volatile fractions or gases, the recovery of which in a liquid form is not required, and a gaseous one, practically free of fractions of minor volatility, by subjecting the said mixture of hydrocarbons to a rectification process at a pressure in excess of 20 atmospheres within a range of temperatures at which the most volatile components are kept partly in a gaseous and partly in a liquid state during the whole process of rectification.

6. Process for the separation of a mixture of hydrocarbons of different volatility into a gaseous and a liquid component each substantially free of the other, which consists in subjecting said mixture to rectification under high pressure and elevated temperature, the temperature at one phase of said rectification process being sufficient to volatilize all of said gaseous component, said pressure being sufficiently high to permit the condensation of a portion of said gaseous component, cooling a portion of said gaseous component at a phase of said rectification process at which the last traces of said liquid component are carried in said gaseous component, whereby a portion of said gaseous component is condensed, and washing said liquid component from said gaseous component by said condensed gaseous component.

7. The process as claimed in claim 1 in which the hydrocarbon-mixture is subjected to a preliminary pressure treatment, the pressure employed being at least equal to that used during the subsequent rectification and the temperature simultaneously employed is lower than the maximum temperature employed during rectification.

8. The process as claimed in claim 1 in which the hydrocarbon-mixture is subjected to a preliminary pressure treatment, the pressure employed being higher than that employed in the subsequent rectification, and the temperature simultaneously employed is lower than the maximum temperature employed in rectifying.

9. The process as claimed in claim 1 in which the rectification is effected at a pressure of about 20 atmospheres, and a maximum temperature of 150° C. and a minimum temperature of 40° C.

10. The process as claimed in claim 1 in which the hydrocarbon-mixture is subjected to a preliminary compression treatment and the rectification is effected at a pressure of about 20 atmospheres, the maximum temperature employed remaining under 150° C.

11. The process as claimed in claim 1 in which the hydrocarbon-mixture is subjected to a preliminary treatment at a pressure in excess of about 20 atmospheres and a temperature of 150° C.

In testimony whereof I have affixed signature in presence of two witnesses.

JAN HEINRICH CHRISTOPH de BREY.

Witnesses:
T. A. ABELEVEN,
CHWANN BERGS.